United States Patent [19]

Mori

[11] 4,445,022
[45] Apr. 24, 1984

[54] ARC WELDING ROBOT CONTROL SYSTEM

[75] Inventor: Shunji Mori, Nagoya, Japan

[73] Assignee: Mitsubishi Denki Kabushiki Kaisha, Tokyo, Japan

[21] Appl. No.: 356,152

[22] Filed: Mar. 8, 1982

[30] Foreign Application Priority Data

Mar. 9, 1981 [JP] Japan ................................ 56-33679
Mar. 9, 1981 [JP] Japan ................................ 56-33683

[51] Int. Cl.³ ............................................. B23K 9/12
[52] U.S. Cl. .............................. 219/125.1; 219/130.5
[58] Field of Search ............ 219/125.1, 125.11, 124.1, 219/130.5

[56] References Cited

U.S. PATENT DOCUMENTS 3,267,251 8/1966 Anderson .......................... 219/125.1
4,224,501 9/1980 Lindbom et al. ................. 219/125.1
4,283,618 8/1981 Jakob ................................ 219/130.5

Primary Examiner—C. C. Shaw
Attorney, Agent, or Firm—Wenderoth, Lind & Ponack

[57] ABSTRACT

An arc welding robot control system in which a control console stores the welding conditions upon the completion of a welding cycle. When a suspension of the welding cycle is commanded during its execution, the welding cycle is effected under the stored welding conditions and its robot is stopped at a suspension point. The control console may further include two memories for respectively storing the position of the suspension point and a current and the next position of the robot with coefficients for a linear interpolation. When the welding cycle is restarted after the robot has been displaced from the suspension point to another point, the torch is automatically returned back to the suspension point along a line passed through the two points and points interpolated through calculations of the content of the memories. The torch is moved through taught points and a similarly interpolated point.

4 Claims, 13 Drawing Figures

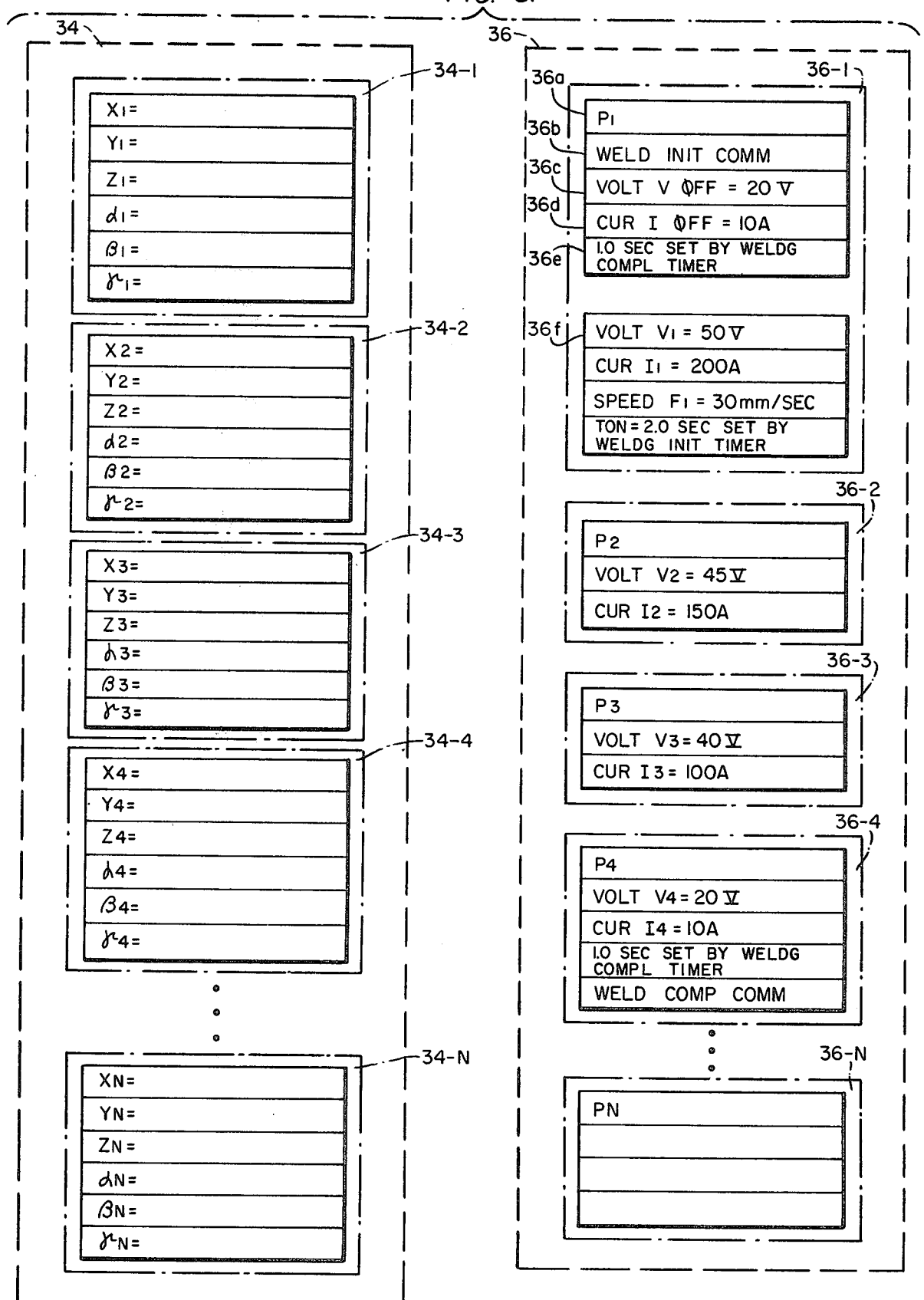

ARC WELDING ROBOT CONTROL SYSTEM

BACKGROUND OF THE INVENTION

This invention relates to improvements in an arc welding robot control system adopting the so-called point-to-point teaching method; that is, a computer controlled playback system by which a robot is automatically moved from one to another of a plurality of points stored therein.

A conventional arc welding robot control system of the type referred to has comprised a control console including a welding initiating pushbutton and a welding suspending pushbutton, and a teaching box for teaching a robot a plurality of points to be moved by the latter. The control console has stored therein positions of those points and the welding conditions such as a welding voltage, a welding current, etc. at each of the points and has controlled the robot and therefore so as a welding torch movably secured thereto to be moved from one to another of the stored points while the torch effects the welding of the particular workpiece on a welding line as taught by the teaching box.

When the welding suspending pushbutton is depressed for some reason, the robot is put in its inoperative state and the torch travel is stopped. At the same time, the control console commands a mating electric source of arc welding power to interrupt the welding condition so as to thereby suspend the welding. This suspension of the welding has resulted in disadvantages in that weld defects such as craters occur on the workpiece, the welding torch is fused to the workpiece, the workpiece is rendered unusable, etc. Thus, the restarting of the welding might become meaningless.

Also, when the welding suspending pushbutton is depressed upon the welding torch reaching one of the stored points, the welding has not be suspended at that point and has proceded to the next succeeding point after which the torch is stopped at the latter point resulting in the suspension of the welding. Alternatively, the torch would be able to be stopped short of one of the taught or stored points and displaced to a point deviating from a section of a straight line extending between that stored point and the just preceding stored point for the purpose of observing the status of that point or correcting the position of the workpiece. Then, the depression of the welding starting pushbutton has caused the welding torch to travel along a line starting with the displaced point and running to that stored point short of which the torch has been stopped. That is, the torch has passed through a line quite different from that connecting the stored points. This has resulted in the disadvantages that the workpiece is rendered unusable because it has been welded along a line which is different from a line preliminarily taught by the teaching box and a working efficiency is very poor.

SUMMARY OF THE INVENTION

Accordingly it is an object of the present invention to provide a new and improved arc welding robot control system including means for preventing weld defects from occurring on a workpiece even through the arc welding is suspended at any time point during the execution thereof.

It is another object of the present invention to provide a new and improved arc welding robot control system including means for preventing expensive workpieces from being rendered unusable.

It is still another object of the present invention to provide a new and improved arc welding robot control system including means for ensuring that, after a welding torch has been stopped at any point on a welding line taught by a teaching box during the execution of an arc welding cycle and then displaced from the welding line, the arc welding cycle is restarted so as to be executed as taught with the welding torch returned back to that point a which the torch had been stopped.

It is a further object of the present invention to provide a new and improved arc welding robot control system having an excellent working efficiency.

The present invention provides an arc welding robot control system for automatically moving a robot from one to another of a plurality of stored and comprising a robot driving means for driving a main body of a robot, a positioning control means for controlling the robot driving means, a welding source control means for controlling an electric source of arc welding power, a first memory for storing therein coordinates of positions of a plurality of taught points, an input means for delivering welding conditions corresponding to each of the taught points, a second memory for storing therein the welding conditions delivered from the input means, a welding suspending input means for delivering a suspending signal for stopping the robot when the robot is automatically being moved in the order of the coordinates of the taught points stored in the first memory, and a central processing unit which is responsive to the entry of the suspending signal from the welding suspending input means so as to read out the welding cycle conditions upon the completion of a welding from the second memory and apply to supply a corresponding signal to the welding source control means.

The present invention also provides an arc welding robot control system for automatically moving a robot from one to another of a plurality of stored points, and comprising a robot driving means for driving a main body of a robot, a positioning control means for controlling the robot driving means, a welding source control means for controlling an electric source of arc welding power, a first memory for storing therein coordinates of positions of a plurality of taught points, an input means for delivering welding conditions corresponding to each of the taught points, a second memory for storing therein the welding conditions delivered from the input means, a welding suspending input means for delivering a suspending signal for stopping the robot when the robot is automatically being moved in the order of the coordinates of the taught points stored in the first memory, a third memory which is responsive to the entry of the suspending signal from the welding suspending input means so as to store coordinates of a position of a suspension point therein, a fourth memory for storing therein interpolation coefficients, coordinates of a current position of the robot, and coordinates of the next succeeding position of the robot, a welding restarting input means for delivering a restarting signal for restarting the welding cycle after the suspending signal suspends the welding cycle, and a central processing unit which is responsive to the entry of the suspending signal from the welding suspending input means so as to read out the welding condition upon the completion of the welding cycle from the second memory and to supply corresponding signals to the welding source control means and the positioning control means, the central processing unit being responsive to the entry of the restarting signal from the welding restarting input means so as to read out the coordinates of the position of the suspension point from the third memory and compare the read coordinates with the coordinates of the current position of the robot read out from the fourth memory so as to deliver a displacement signal for the robot to the positioning control means.

BRIEF DESCRIPTION OF THE DRAWINGS

The present invention will become more readily apparent from the following detailed description taken in conjunction with the accompanying drawings in which:

FIG. 6 is a diagram of the details of the memories shown in FIG. 5;

DESCRIPTION OF THE PREFERRED EMBODIMENTS

Figure 1:
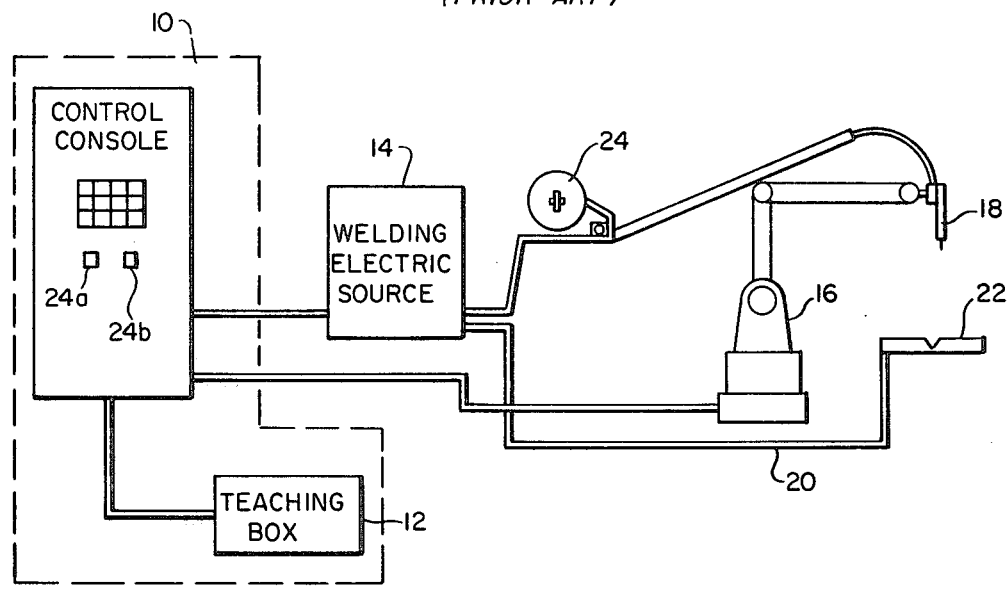
FIG. 1 is a side elevational view of a conventional arc welding robot apparatus.

Referring now to FIG. 1 of the drawings, there is illustrated the entire construction of a conventional arc welding robot apparatus according to the so-called point-to-point teaching method; that is, a computer controlled playback system. The illustrated arrangement comprises a control console 10 and a teaching box 12 electrically connected to the control console 10 through a connecting cable. The control console 10 supplies various welding conditions to an arc welding source 14 and a main robot body 16 through connecting cables. The arc welding source 14 is connected via a power cable to an arc welding torch 18 mounted to a movable arm extending from the extremity of the main robot body 16 on the one hand and via a power cable 20 to a workpiece 22 on the other hand. Also, a welding wire feed reel 24 supplies a welding wire to the welding torch 18 under the control of the welding source 14. The arc welding is effected on that portion of the workpiece 22 put directly under the tip of the torch 18.

The control console 10 is shown in FIG. 1 as being provided on the front surface with a welding initiating pushbutton 24a and a welding suspending pushbutton 24b.

In operation, the welding suspending pushbutton 24b can be depressed to stop the operation of the main robot body so as to suspend the travel of the welding torch 18.

At the same time, the control console 10 supplies to the welding source 14 a command signal for interrupting all the welding conditions such as a welding voltage, a welding current, a speed of feed of the welding wire, etc. resulting in the suspension of the arc welding operation. At that time, disadvantages might occur in that weld defects such as craters occur on the workpiece, or the welding torch is fused to the workpiece. Therefore, the restarting of the welding operation might become meaningless.

Figure 2:
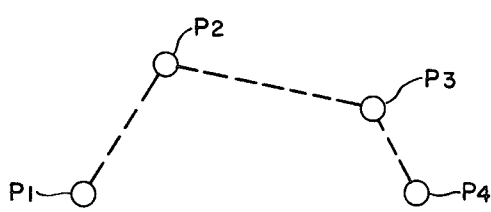
FIGS. 2, 3 and 4 are graphs illustrating paths of travel of the extremity of the welding torch shown in FIG. 1 and are useful in explaining the movements of the tip of the torch upon the suspension of the particular arc welding cycle and after the restarting thereof.
Figure 3:
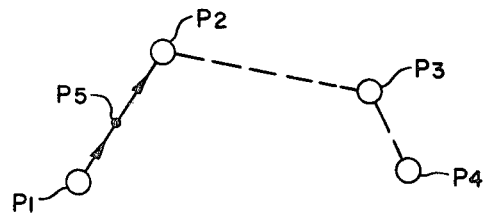

It is now assumed that the teaching box 12 has taught the welding torch 18 to travel along a welding path passing through points $P_1$, $P_2$, $P_3$ and $P_4$ in the named order on the workpiece 22 as shown in FIG. 2. It is also assumed that during the travel of the tip of the torch 22 from the point $P_1$ to the point $P_2$, an objection, for example, an erroneous setting of the workpiece 22 has been caused at a point $P_5$ between the points $P_1$ and $P_2$ as shown in FIG. 3. Under the assumed conditions, the welding suspension pushbutton 26b has been depressed in order to suspend the particular welding cycle. This measure has not resulted in the suspension of the welding cycle at the point $P_5$. More specifically, the welding torch 18 has continued to effect the welding cycle until it reaches the next succeeding point $P_2$ taught by the teaching box 12 followed by the stoppage of the travel thereof at that point $P_2$. Thus, the welding cycle has been suspended at the point $P_2$.

Figure 4:
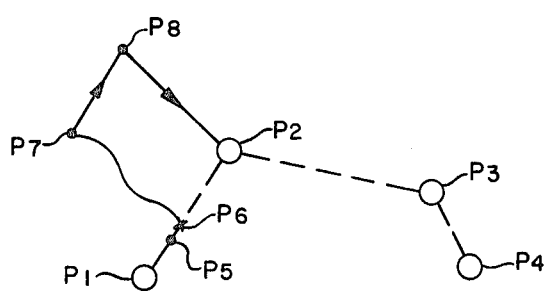

Alternatively, the welding torch might be able to be stopped at a point $P_6$ adjacent to the point $P_5$ as shown FIG. 4, and displaced to a point $P_7$ deviating from a section of a straight line $P_1P_2$ as shown in FIG. 4, in order to observe the status at the point $P_6$ or correct the position of the workpiece 22. After the removal of an objection, the welding initiating pushbutton 24a is depressed. This has resulted in the welding torch 18 traveling along a section of a straight line starting with the point $P_7$ and running to a point $P_8$ so as to be parallel to the section of the straight line $P_1P_2$ and then along a section of a straight line $P_8P_2$. Thus, the welding torch has passed through a path including the points $P_1$, $P_6$, $P_7$, $P_8$ and $P_2$ and is quite different from the section of the straight line $P_1P_2$ preliminarily taught by the teaching box 12.

From the foregoing it is seen that conventional control console systems for the arc welding robot apparatus such as described above have been disadvantageous in that, with the welding suspended and then restarted, the welding is effected along a path different from that preliminarily taught by the teaching box so as to render the particular workpiece unusable and that the working efficiency thereof is very poor.

Figure 5:
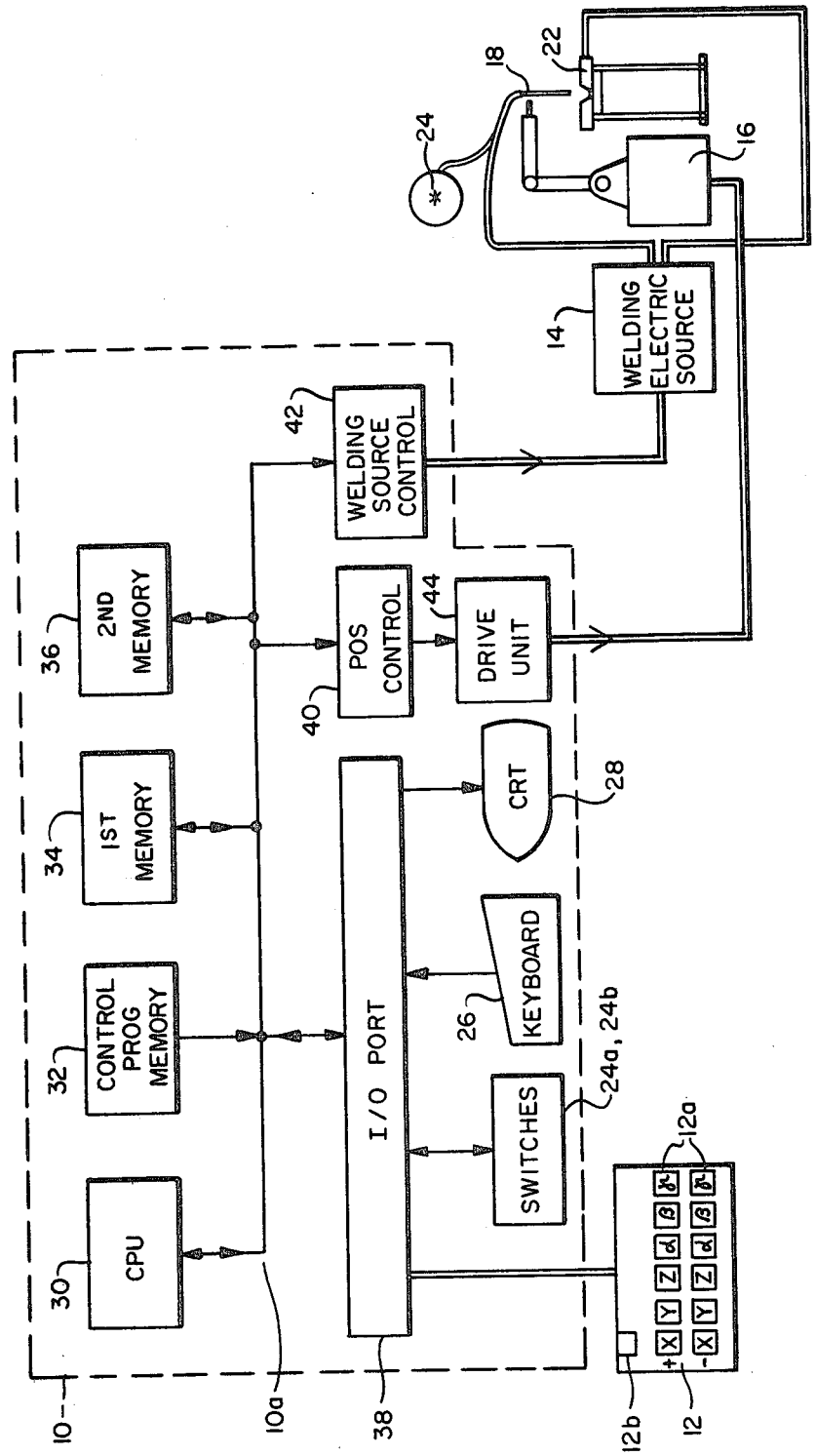
FIG. 5 is a block diagram of one embodiment according to the arc welding robot control system of the present invention with parts illustrated in elevation.

Referring now to FIG. 5 wherein like reference numerals designate the components identical to those shown in FIG. 1, there is illustrated one embodiment according to the arc welding robot control system of the present invention. The illustrated arrangement comprises a control console 10 and a teaching box 12 including a plurality of direction indicating pushbutton 12a, in this case, ten pushbutton arranged in two rows which are respectively labelled with positive and negative signs and five columns each including one pair of the pushbuttons which are respectively labelled the same reference characters X, Y, Z, $\alpha$ or $\beta$ and a recording pushbutton 12b disposed above the direction indicating pushbutton 12a which is labelled the reference character X.

The control console 10 includes a pair of welding initiating and suspending pushbuttons shown at block 24a-24b as described above in conjunction with FIG. 1, a keyboard 26 and an indicator 28 labelled with the reference CRT which means a cathode ray tube. The keyboard 26 includes a plurality of keys for setting the welding conditions for executing the particular welding cycle. The control console 10 further includes a central processing unit 30, a control programming memory 32 for storing a control program therein, a first memory 34 for storing coordinates of positions of a plurality of points taught by the teaching box 12 and a conditional second memory 36 for storing therein the welding conditions at each of the points for executing the particular arc welding cycle and an input/output port 38 connected to the teaching box 12, the pushbuttons 24a and 24b, the keyboard 26 and the indicator 28.

In addition, the control console 10 comprises a common bus 10a serving to cause the central processing unit 30 to send and receive signals to and from the memories 32, 34 and 36 and the input/output port 38. The common bus 10a is further connected to both a positioning controller 40 and a welding source controller 42. The positioning controller 40 is connected to a robot driving unit 44 subsequently connected to the main robot body 16 while the welding source controller 42 is connected to the arc welding source 14 which is, in turn, connected to the welding torch 18 and the workpiece 22 as described above in conjunction with FIG. 1.

Figure 7:
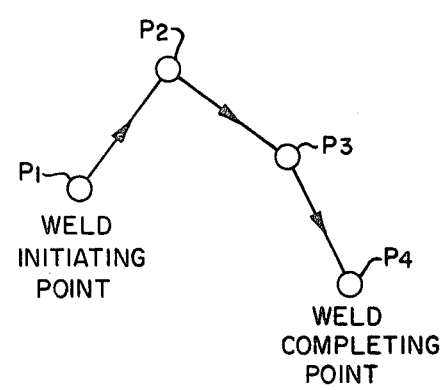
FIG. 7 is a graph illustrating a path of travel of the tip of the welding torch as shown in FIG. 5 as controlled by the arrangement shown in FIG. 5.

The operation of the arrangement shown in FIG. 5 will now be described with reference to FIG. 6 wherein there are illustrated storage contents of the first and second memories 34 and 36 and FIG. 7 wherein there is illustrated a travel path along which the tip of the torch 18 successively steps above the workpiece 22. The direction indicating pushbuttons 12a on the teaching box 12 are suitably depressed so that the torch 18 is moved to a first point $P_1$ adjacent to the workpiece 22 as shown in FIG. 7 through the input/output port 32, the common bus 10a, the positioning controller 40, and the robot driving unit 44. Then, the recording pushbuttons 12b are depressed so as to store in the first memory 34 three orthogonal coordinates X, Y and Z and an attitude $\alpha$, $\beta$ and $\gamma$ of the torch relative to three orthogonal axes of the particular three-dimentional orthogonal coordinate system (not shown) at that point through the input/output port 38 and the common bus 10a. The process as described above is repeated with the succeeding points adjacent to the workpiece 22 to successively store in the first memory the coordinates of positions and attitudes of the torch at those points. In the illustrated example the teaching box 12 teaches the welding torch 18 the positions and attitudes at four points $P_1$, $P_2$, $P_3$ and $P_4$ and memory 34 includes a plurality of sections 34-1, 34-2, ..., 34-N one for each of N points. In the illustrated example, each of the four sections 34-1, 34-2, 34-3 and 34-4 has stored therein the corresponding coordinates $X_i$, $Y_i$ and $Z_i$ of the position and the attitudes $\alpha_i$, $\beta_i$ and $\gamma_i$ (which i has a value of 1, 2, 3 and 4) of the torch at the point $P_1$, $P_2$, $P_3$ or $P_4$. The remaining sections terminating at a section 25-N are clear because of the presence of the four points $P_1$, $P_2$, $P_3$ and $P_4$.

Subsequently, the keyboard 26 is suitably depressed to set the welding conditions at each point for executing the particular arc welding cycle and to store them in the second memory 36 through the input/output port 38 and the common but 10a. The keyboard 26 is first depressed to define the point $P_1$ as a welding initiation point and to store a command for initiating a welding cycle in the second memory 36 at a position as will be described later. As shown in FIG. 6, the second memory 38 is divided into a plurality of sections 36-1, 36-2, ..., 36-N, one for each of N points, as in the first memory 34. In the second memory 36, however, the first section 36-1 assigned to the welding initiation point is divided into a pair of first and second subsections. The first subsection includes a first position 36a where the first or welding initiation point $P_1$ is designated, a second position 36b where the command for initiating a welding is stored and the remaining three positions 36c, 36d and 36e. The second substation includes four positions having the welding conditions at the point $P_1$ stored therein with a first position thereof designated by the reference numeral 36f.

Then, the keyboard 26 is suitably depressed to store the welding conditions such as a welding voltage, a welding current, a welding speed, etc. for a welding cycle effected between the points $P_1$ and $P_2$ in the second substation starting with the position 36f. Furthermore, the second substation includes the last position where a welding initiating time Ton of 2 seconds set by a welding initiating timer (not shown) is stored. That time Ton starts with with completion of the confirmation of all the taught points as will be described later. Following this, the process as described above is repeated with the points $P_2$, $P_3$, ... where the welding conditions are intended to change so as to thereby store the respective welding conditions in the sections 36-2, 36-3, ... in the second memory 36 until the finishing point is reached where the welding cycle is completed. In the illustrated example, the welding is completed at the point $P_4$. Therefore, in the section 36-4 assigned to the point $P_4$ of the second memory 36 there are stored a predetermined welding completing time set by a welding completing timer (not shown) and a command for the completing of the welding cycle, in addition to the welding conditions required between the points $P_3$ and $P_4$. That time is shown in FIG. 6 as being of 1.0 one second.

In this way, a series of welding conditions have been set between the initiation of a welding cycle and the completion thereof and are stored in the second memory 36.

The arrangement of FIG. 5 performs the playback operation in the automatic mode under the control of the central processing unit 30. More specifically, the tip of the welding torch 18 is initiated to step along a welding line including the points $P_1$, $P_2$, $P_3$ and $P_4$ upon theissuance of the common command for initiating the welding cycle from the second memory 36 due to the depression of the welding initiating pushbutton 24a. Then, the tip of the torch 18 successively steps along the welding line in the order of the coordinates of the positions of those points stored in the first memory 34 and under the welding conditions at the corresponding points stored in the second memory 36 through the positioning and welding source controllers 40 and 42. Finally, the tip of the torch 18 reaches the point $P_4$. At the point $P_4$, a command for completing the welding cycle is issued from the second memory 36 so as to stop the torch at the point $P_4$ and complete the welding cycle.

During the execution of the welding cycle as described above, the welding suspending pushbutton 24b may be depressed so as to suspend the welding cycle for some reason. To this end, the first section 36-1 of the second memory 36 includes the positions 36c, 36d and 36e following the position 36b where the command for initiating the welding cycle is stored in the first subsection thereof. Those positions 36c, 36d and 36e have stored thereat the welding conditions nearest to the command for completing the welding cycle among those at the abovementioned point. In the illustrated example, the position 36c has stored therein a voltage of 20 volts at the point $P_4$ among the respective voltages of 50, 45, 40 and 20 volts at the points $P_1$, $P_2$, $P_3$ and $P_4$ and the position 36d has stored thereat a current of 10 amperes among respective currents of 200, 150, 100 and 10 amperes. The welding time stored at the position 36e is of 1.0 second set by a welding completing timer (not shown). The welding conditions thus stored at the positions 36c, 36d and 36e form the crater conditions upon the completion of the welding.

When the crater conditions upon the completion of the welding cycle are stored as described above, the welding suspending pushbutton 24b can be depressed at any time point during the particular welding cycle and for some reason. The central processing unit 30 is responsive to the depression of the pushbutton 24b to read out the crater conditions from the second memory 36 and to supply a corresponding signal to the welding source controller 42 to control the welding source 14 which, in turn, effects a welding cycle being put under the crater conditions. At the same time, the central processing unit 30 applies a suspending signal to the positioning controller 40 so as to stop the main robot body 16 and therefore the torch 18. Thus, the welding cycle is suspended.

From the foregoing it is seen that the depression of the welding suspending pushbuttons 24b causes the execution of the crater conditions. This results in the prevention of weld defects developed on the workpiece. Thus, there is exhibited the effect that expensive workpieces can be prevented from being rendered unusable.

Figure 8:
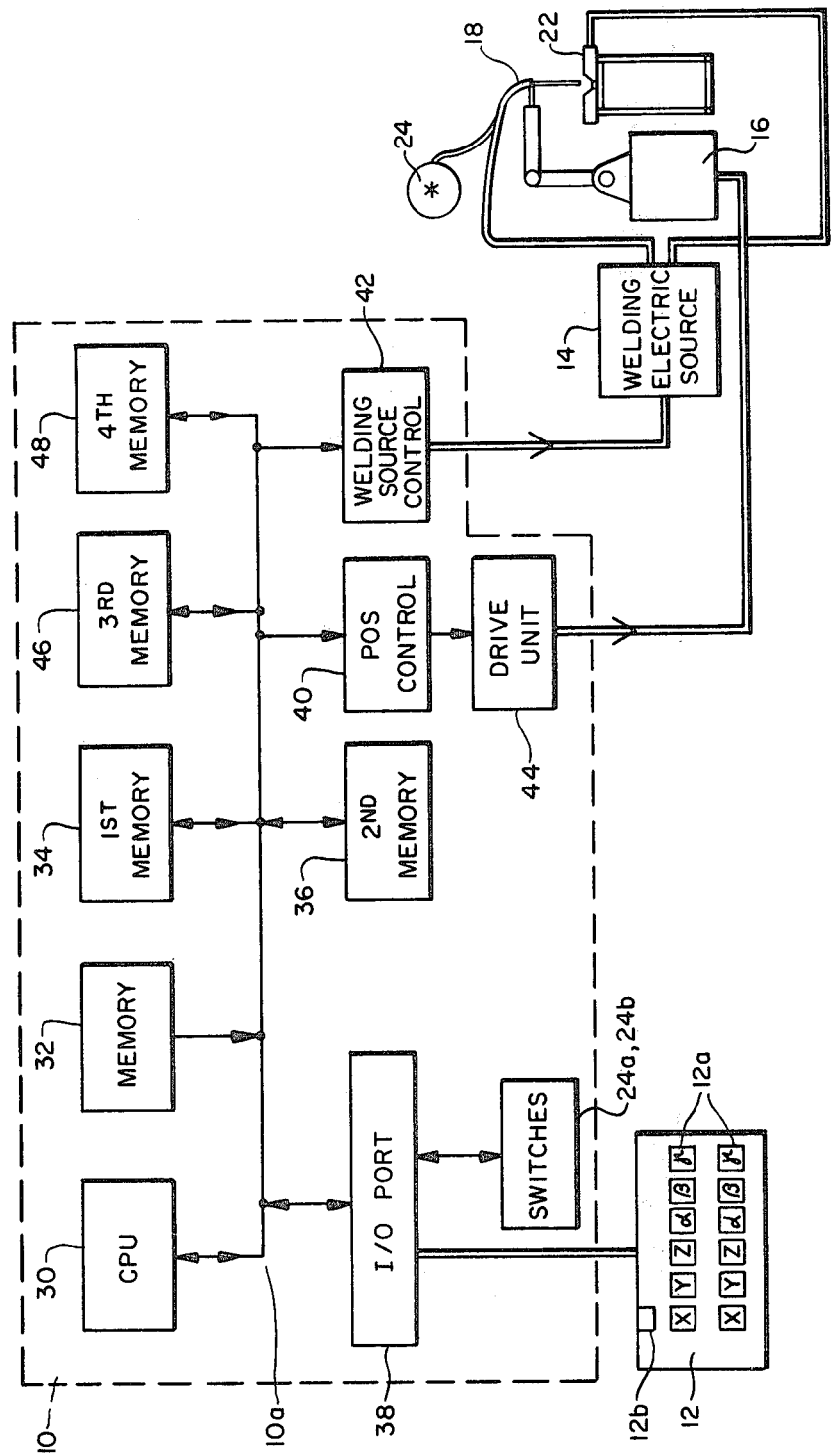
FIG. 8 is a diagram similar to FIG. 5 but illustrating a modification of the present invention.

Referring now to FIG. 8, wherein like reference numerals designate the components identical to those shown in FIG. 5, there is illustrated a modification of the present invention. The arrangement is different from that shown in FIG. 5 only in that in FIG. 8, a third memory 46 and a fourth memory 48 are additionally connected via the common bus 10a to the central processing unit 30 to send and receive signals to and from the central processing unit 30 with the keyboard 26 and the indicator 28 omitted only for purposes of illustration.

Figure 9:
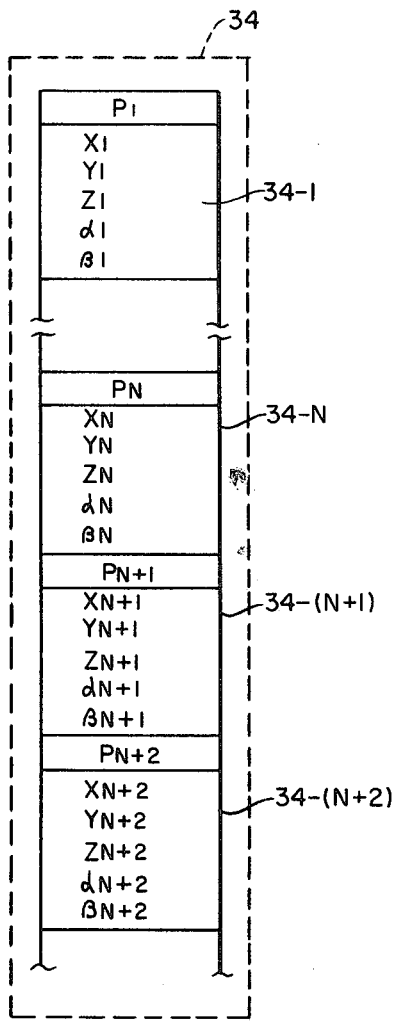
FIGS. 9, 10 and 11 are diagrams of the details of some of the memories shown in FIG. 8.

The first memory 34 is shown in FIG. 9 as including (N+2) sections 34-1, . . . , 34-N, 34-(N+L) and 34-(N+2) which are identical to those of the memory 34 as described above in conjunction with FIG. 6 excepting that the attitude of the welding torch is expressed by $\alpha$ and $\beta$. It is noted that the abovementioned $\gamma$ is omitted because $\alpha$, $\beta$ and $\gamma$ fulfill a certain relationship. Thus, the teaching box 12 has taught the torch 18 (N+2) points adjacent to the workpiece 22.

Figure 10:
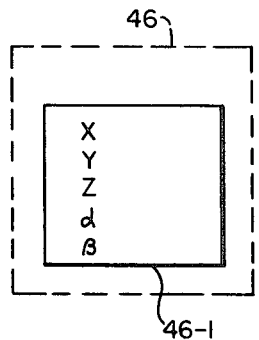

The third memory 46 is shown in FIG. 10 as including a single section in which coordinates X, Y, Z, $\alpha$ and $\beta$ of a position of a suspension point are stored in the same manner as each section of the second memory 34 as shown in FIG. 9.

Figure 11:
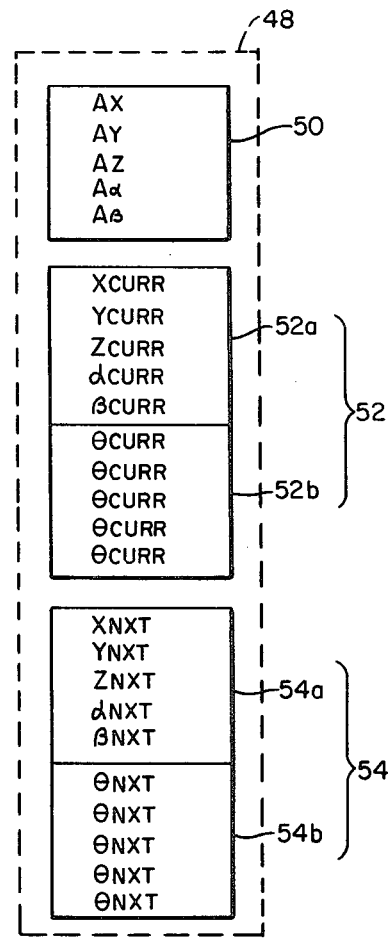
Figure 12:
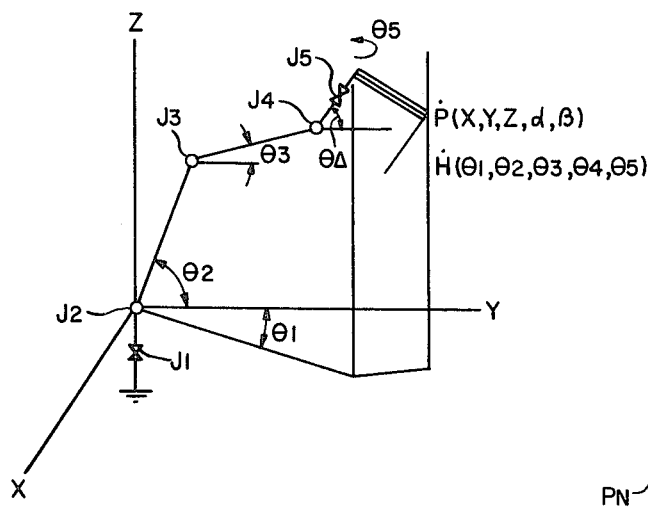
FIG. 12 is a three-dimensional orthogonal coordinate system for expressing the position and attitude of the main robot body with the welding torch shown in FIG. 8.

The fourth memory 48 stores coefficients for a three-dimentional linear interpolation, and a current and next succeeding positions of the torch 18 and is shown in FIG. 11 as including a section 50 where coefficients $A_X$, $A_Y$, $A_Z$, $A_{60}$ and $A_{62}$ for the three-dimensional linear interpolation, a section 52 where coordinates $X_{curr}$, $Y_{curr}$, $Z_{curr}$, $\alpha_{curr}$ and $\beta_{curr}$ of the current position of the torch 18 are stored and a section 54 where coordinates $X_{NXT}$, $Y_{NXT}$, $Z_{NXT}$, $\alpha_{NXT}$ and $\beta_{NXT}$ of the next succeeding position thereof is stored The welding torch 18 secured to the main robot body 16 has a tip whose position is expressed by three coordinates X, Y and Z of a three-dimensional orthogonal coordinate system as shown in FIG. 12 and its attitude expressed by angles $\alpha$ and $\beta$ relative to the coordinate axes X, Y and Z. The main robot body 16 also includes a joint system formed of joints $J_1$, $J_2$, $J_3$, $J_4$ and $J_5$ having respective angles $\theta_1$, $\theta_2$, $\theta_3$, $\theta_4$ and $\theta_5$ shown in FIG. 12.

Thus, the position of the tip and attitude of the torch are expressed by the coordinates of the orthogonal coordinate system which is called hereinafter a vector $\dot{P}(X, Y, Z, \alpha, \beta)$ and the coordinates of the joint system is called hereinafter a vector $\dot{H}(\theta_1, \theta_2, \theta_3, \theta_4, \theta_5)$. Then, the following expressions:

$$\dot{P} = \dot{M} \cdot \dot{H} \qquad (1)$$

and $$\dot{H} = \dot{M}^{-1} \cdot \dot{P} \qquad (2)$$

hold between the vector $\dot{P}$ and $\dot{H}$ were $\dot{M}$ designates a maxtrix for coordinate transformation and $\dot{M}^{-1}$ designates a matrix for inverse coordinate transformation.

The positioning controller 40 will now be described. That controller 40 is formed of a digital servo mechanism. More specifically, the central processing unit 30 transfers an angular displacements $\Delta\theta_1$, $\Delta\theta_2$, $\Delta\theta_3$, $\Delta\theta_4$ and $\Delta\theta_5$ of the points $J_1$, $J_2$, $J_3$, $J_4$ and $J_5$ desired to be changed within a minute time interval $\Delta T$ to the positional controller 40 through the common bus 10a. The positional controller 40 receives those angular displacements $\Delta\theta_1$ through $\Delta\theta_5$ and delivers a command speed to the robot driving unit 44 to control the positioning of the main robot body 16 in such a manner that the angular displacements have null errors relative to positions fed back from a position sensor (not shown) through a process of slowly adjusting the travel speed of the main robot body or torch.

Figure 13:
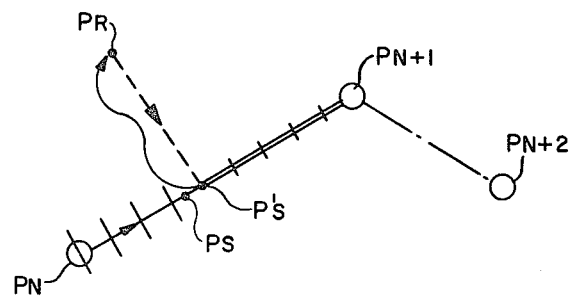
FIG. 13 is a graph useful in explaining the operation of the arrangement shown in FIG. 8.

Also, the three-dimensional linear interpolation is effected as follows: It is recalled that the first memory 34 has stored therein positional data taught by the teaching box 12 by the taught coordinates of the positions of the points referring to the three-dimensional orthogonal coordinate system shown in FIG. 9 as illustrated in the sections 34-1, . . . , 34-N, 34-(N+1) and 34-(N+2) of the first memory 34. For example, the positional data shown in the sections 34-N, 34-(N+1) and 34-(N+2) correspond to points $P_N$, $P_{N+1}$ and $P_{N+2}$ as shown in FIG. 13.

It is now assumed that a three-dimensional linear interpolation is effected between the point $P_N$ having its coordinates expressed by a vector $\dot{P}_N(X_N, Y_N, Z_N, \alpha_N, \beta_N)$ referring to the orthogonal coordinated system and the point $P_{N+1}$ having its coordinates similarly expressed by a vector $\dot{P}_{N+1}(X_{N+1}, Y_{N+1}, Z_{N+1}, \alpha_{N+1}, \beta_{N+1})$. Under the assumed conditions, a section of a straight line $P_N P_{N+1}$ extending between the points $P_N$ and $P_{N+1}$ has a slope expressed by a slope vector $A_N$. $(\dot{A}_X, A_Y, A_Z, A_\alpha, \beta_\alpha)$ and thus:

$$A_N^T = \begin{Bmatrix} A_X \\ A_Y \\ A_Z \\ A_\alpha \\ A_\beta \end{Bmatrix} = \begin{Bmatrix} (X_{N+1} - X_N)/DL \\ (Y_{N+1} - Y_N)/DL \\ (Z_{N+1} - Z_N)/DL \\ (\alpha_{N+1} - \alpha_N)/DL \\ (\beta_{N+1} - \beta_N)/DL \end{Bmatrix} \quad (3)$$

where $D_L$ designates a distance of from the point $P_N$ to the point $P_{nl}$ and may be expressed by:

$$DL = \sqrt{(X_{N+1} - X_N)^2 + (Y_{N+1} - Y_N)^2 + (Z_{N+1} - Z_N)^2}$$

Components of the vector $\dot{A}_N$ are stored in the section 50 of the fourth memory 48 as stored data for interpolation coefficients.

Then, the coordinates of the current path $P_N$ are transferred to an orthogonal subsection 52a included in the section 52 of the fourth memory 48. Those transferred coordinates form a current vector $\dot{P}_{curr}$. The point $P_N$ is reached by calculating the joint coordinates following the expression (2) and calculating a current vector $\dot{H}_{curr}$ in accordance with:

$$\dot{H}_{curr} = \dot{M}^{-1} \cdot \dot{P}_{curr} \quad (4)$$

The current vector $\dot{H}_{curr}$ thus calculated is transferred to and stored in a joint subsection 52b included in the section of 52 of the fourth memory 48.

Assuming that the orthogonal coordinates after the minute time interval $\Delta T$ is called the next succeeding vector $\dot{P}_{NXT}$, the slope vector $\dot{A}_N$ expressed by the expression (3) and a travel speed F of the torch are used to calculate the next succeeding vector:

$$\dot{P}_{curr} + \dot{A}_N \cdot F \cdot \Delta T \quad (5)$$

The next succeeding vector $\dot{P}_{NXT}$ thus calculated is transferred to and stored in an orthogonal subsection 54a included in the section 54 of the fourth memory 48. Subsequently, the next succeeding vector $\dot{H}_{NXT}$ is calculated in the similar manner as described above in conjunction with the currect vector $\dot{H}_{curr}$. That is, the next succeeding vector $\dot{H}_{NXT}$ may be calculated as follows:

$$\dot{H}_{NXT} = \dot{M}^{-1} \cdot \dot{P}_{NXT} \quad (6)$$

The next succeeding vector $\dot{H}_{NXT}$ thus calculated is transferred to and stored in a joint subsection 54b included in the section 54 of the fourth memory 48.

Thus, a difference $\Delta \dot{H}$ between the current vector $\dot{H}_{curr}$ and the next succeeding vector $\dot{H}_{NXT}$ may be expressed by:

$$\Delta \dot{H} = \dot{H}_{NXT} - \dot{H}_{curr}$$

That difference $\Delta \dot{H}$ indicates the angular displacements by which the respective joints are to be displaced for the minute time interval $\Delta T$ and is transferred to the positioning controller 40.

The controls as described above are effected at the minute time intervals $\Delta T$ to permit the tip of the torch to travel at the traveling speed F on the section of the straight line $P_N P_{N+1}$ at the minute time intervals $\Delta T$. Even with the traveling speed F varied at the time intervals $\Delta T$, the follow up is possible.

When the tip of the torch is traveling on the section of the straight line $P_N P_{N+1}$, the welding cycle may be suspended for some reason. At that time, it is assumed that the welding suspending pushbutton 24b is depressed upon the torch tip reaching a point $P_S$ (see FIG. 13) located between the points $P_N$ and $P_{N+1}$ so as to command a suspension of a welding cycle. Under the assumed conditions, a command vectorial angular displacement $\Delta \dot{H}$ is transferred to the positioning controller 40 while that angular displacement $\Delta \dot{H}$ is rendered null at the time interval $\Delta T$ succeeding to the depression of the welding suspending pushbutton 24b until the torch is stopped by having its tip facing a point $P'_S$ on the section of the straight line $P_N P_{N+1}$ as shown in FIG. 13.

It is to be understood that at that time the welding is effected according to a crater treatment dependent upon the crater conditions as described above in conjunction with FIGS. 5, 6 and 7. Thus, a good weld results as in the arrangement shown in FIG. 5.

Upon the stoppage of the torch tip at the point $P'_S$, components of the current vector $\dot{P}_{curr}$ are transferred to and stored in in the third memory 46 and strictly in the section 46-1 as coordinates of a suspension point. It is not assumed that, after the coordinates of the suspension point have been stored in the memory 46, the torch is manually moved to a point $P_R$ deviating from the section of the straight line $P_N P_{N+1}$ as shown in FIG. 13 and the welded status at the point $P'_S$ is investigated after which the welding initiating pushbutton 24a is depressed.

Under the assumed conditions, the expression (3) is used to calculate a slope vector $\dot{A}_R$ of a section of a straight line extending between the point $P_R$ and the suspension point $P'_S$. The controls similar to these described above are effected so that the tip of the torch is moved to the suspension point $P'_S$ until the torch is stopped there. Following this, the controls as described above are effected so that the welding proceeds along a section of a straight line $P'_S P_{N+1}$ until the restarting of the welding is completed at a point $P_{N+1}$.

Then, the welding is effected along a section of a straight line extending between the points $P_{N+1}$ and $P_{N+2}$ as determined by the contents of the first and second memories 34 and 36 until it is completed at the point $P_{N+2}$.

While the arrangement of FIG. 8 has not been described in conjunction with the welding conditions it is to be understood that, by storing the welding conditions upon a suspension of the welding in the first memory 36 as described above in conjunction with FIG. 6, the welding conditions can be restored upon restarting the welding.

Since the arrangement of FIG. 8 is designed and constructed so that a position of a suspension point is stored therein, the welding is effected along the welding line as taught by a teaching box involved even through the particular welding cycle is suspended and then restarted.

In summary, the present invention provides an arc welding robot control system arranged to store the crater conditions without or with a position of a suspension point so that the particular welding cycle is effected under the crater conditions upon the suspension thereof, alternatively even if the welding cycle is suspended and then restarted, it is effected along the particular welding line as taught by its teaching box. Therefore, the present invention is advantageous in that a workpiece is prevented from deteriorating in quality or being rendered unusable and the working efficiency can readily be improved.

While the present invention has been illustrated and described in conjunction with a few preferred embodiments thereof, it is to be understood that numerous changes and modifications may be resorted to without departing from the spirit and scope of the present invention.

What is claimed is:

1. An arc welding robot control system for automatically moving a robot from one to another of a plurality of stored points, and comprising a robot driving means for driving a main body of a robot, a positioning control means for controlling said robot driving means, a welding source control means for controlling an electric source of arc welding power, a first memory for storing therein coordinates of positions of a plurality of taught points, an input means for delivering welding conditions corresponding to each of said points, a second memory for storing therein said welding conditions delivered from said input means, a welding suspending input means for delivering a suspending signal for stopping said robot when said robot is automatically being moved in the order of said coordinates of said points stored in said first memory, a third memory which is responsive to the entry of said suspending signal from said welding suspending input means so as to store coordinates of a position of a suspension point therein, a fourth memory for storing therein interpolation coefficients, coordinates of a current position of said robot, and coordinates of a next succeeding position of said robot, a welding restarting input means for delivering a restarting signal for restarting the welding after said suspending signal suspends the welding, and a central processing unit which is responsive to the entry of said suspending signal from said welding suspending input means so as to read out a stored welding condition from said second memory, said stored welding condition corresponding to that of said system upon the completion of the welding, and to apply corresponding signals to said welding source control means and said positioning control means, said central processing unit being responsive to the entry of said restarting signal from said welding restarting input means so as to read out said coordinates of said position of said suspension point from said third memory and compare the read coordinates with said coordinates of said current position of said robot read out from said fourth memory so as to deliver a displacement signal for said robot to said positioning control means.

2. An arc welding robot control system as claimed in claim 1 wherein said interpolation coefficients stored in said fourth memory are used to effect a three-dimensional linear interpolation of the stored coordinates of the positions.

3. An arc welding robot control system as claimed in claim 1, wherein said central processing unit supplies respective signals to said positioning control means and said welding source control means in the order of said coordinate data of said points stored in said first memory and dependent upon said welding conditions stored in said second memory.

4. An arc welding robot control system as claimed in claim 2, wherein said interpolation coefficients stored in said fourth memory are used to calculate a displacement signal for said robot body to be moved from said coordinate of said current point to those of said next succeeding position thereof.

* * * * *